(12) United States Patent
Gadini et al.

(10) Patent No.: US 7,117,595 B2
(45) Date of Patent: Oct. 10, 2006

(54) METHOD FOR MANUFACTURING A CONVEYING ELEMENT OF AN AXIAL TYPE FLOW METER USED FOR DRINK VENDORS

(75) Inventors: Costanzo Gadini, Frassineto Po (IT); Giovanni Perucca, Casale Monferrato (IT)

(73) Assignee: Eltek S.p.A., Casale Monferrato (IT)

( * ) Notice: Subject to any disclaimer, the term of this patent is extended or adjusted under 35 U.S.C. 154(b) by 0 days.

(21) Appl. No.: 11/014,797

(22) Filed: Dec. 16, 2004

(65) Prior Publication Data

US 2005/0097969 A1    May 12, 2005

Related U.S. Application Data

(63) Continuation of application No. PCT/IB03/02681, filed on Jun. 13, 2003.

(30) Foreign Application Priority Data

Jun. 17, 2002    (IT)    .......................... TO2002A0518

(51) Int. Cl.
*B29C 45/04*    (2006.01)
*B29C 45/12*    (2006.01)
*B29C 45/36*    (2006.01)
*B29C 45/40*    (2006.01)

(52) U.S. Cl. .................... 29/889; 29/527.1; 29/889.23; 29/889.7; 73/861.04; 73/861.33; 73/861.89; 264/138; 264/219; 264/239

(58) Field of Classification Search ............... 29/527.1, 29/889, 889.23, 889.7; 73/861.33, 861.89, 73/861.04; 264/239
See application file for complete search history.

(56) References Cited

U.S. PATENT DOCUMENTS

| | | | | |
|---|---|---|---|---|
| 1,859,071 A | * | 5/1932 | Burger | 73/861.89 |
| 3,898,883 A | * | 8/1975 | Kozak et al. | 73/861.33 |
| 4,080,145 A | * | 3/1978 | Jung | 425/451.5 |
| 4,324,145 A | * | 4/1982 | Werkmann | 73/861.89 |
| 4,393,723 A | * | 7/1983 | Brand | 73/861.72 |
| 4,395,919 A | * | 8/1983 | Peters | 73/861.77 |
| 4,404,861 A | * | 9/1983 | Wass | 73/861.83 |
| 5,024,105 A | * | 6/1991 | Tentler et al. | 73/861.58 |
| 5,388,466 A | * | 2/1995 | Teunissen | 73/861.33 |
| 5,818,131 A | * | 10/1998 | Zhang | 310/15 |
| 6,079,972 A | * | 6/2000 | Gellert | 425/552 |

FOREIGN PATENT DOCUMENTS

EP    0 599 341 A    6/1994
EP    1 219 906 A    7/2002

* cited by examiner

*Primary Examiner*—David P. Bryant
*Assistant Examiner*—Christopher Agrawal
(74) *Attorney, Agent, or Firm*—Sughrue Mion, PLLC

(57) ABSTRACT

A device is described for measuring a fluid, to be used advantageously in mixing devices for ingredients of liquid drinks. The device comprises an impeller, a diffuser upstream from the impeller and detecting means for the impeller (46). The diffuser (41) has a core (42), a ring-shaped peripheral portion (43) and one or more separators (45A, 45B) extending between the core (42) and the peripheral portion (43) and developing so as to define helical channels for fluid passage (44A, 44B). The invention also describes an advantageous method for carrying out said diffuser (41).

7 Claims, 5 Drawing Sheets

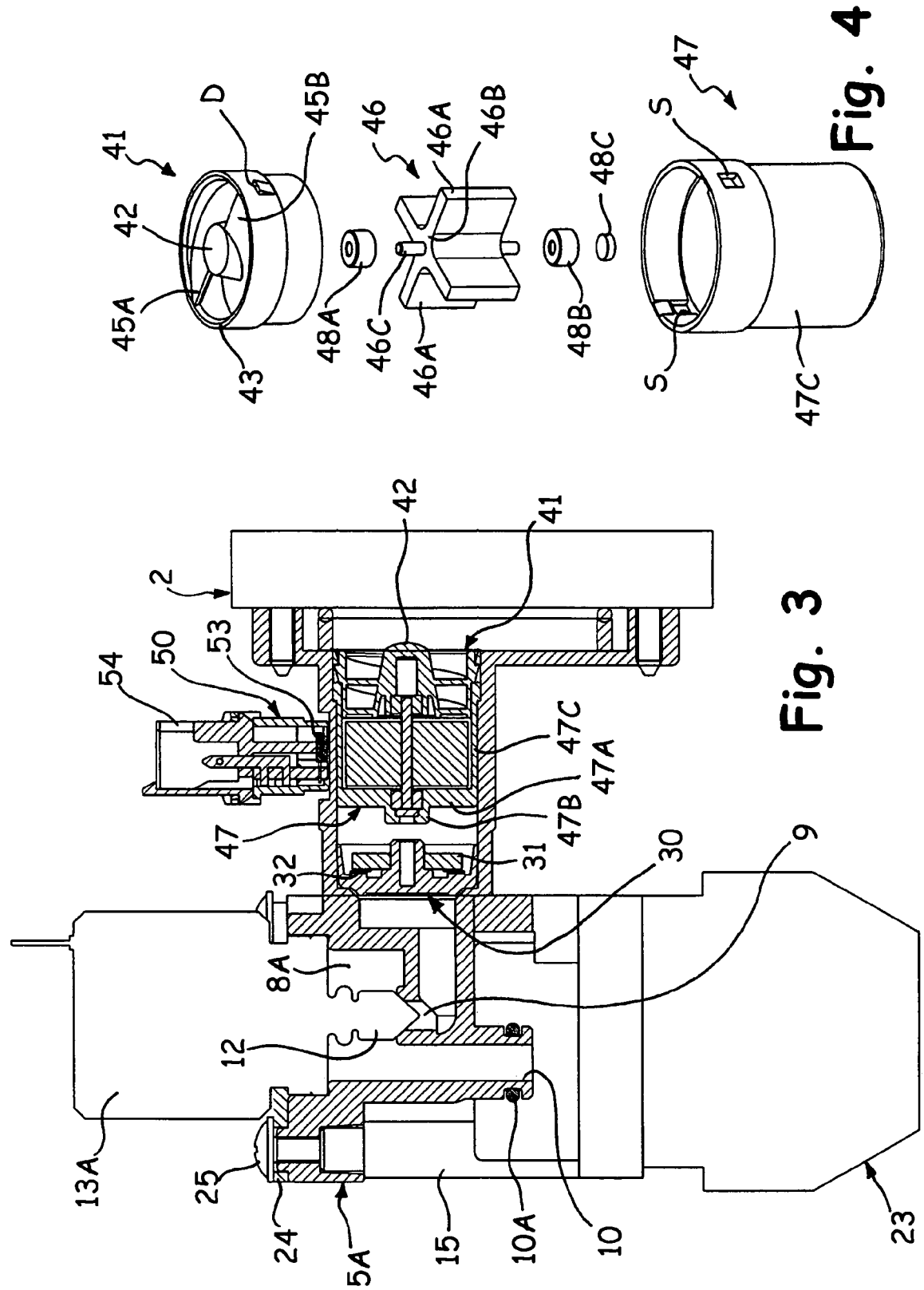

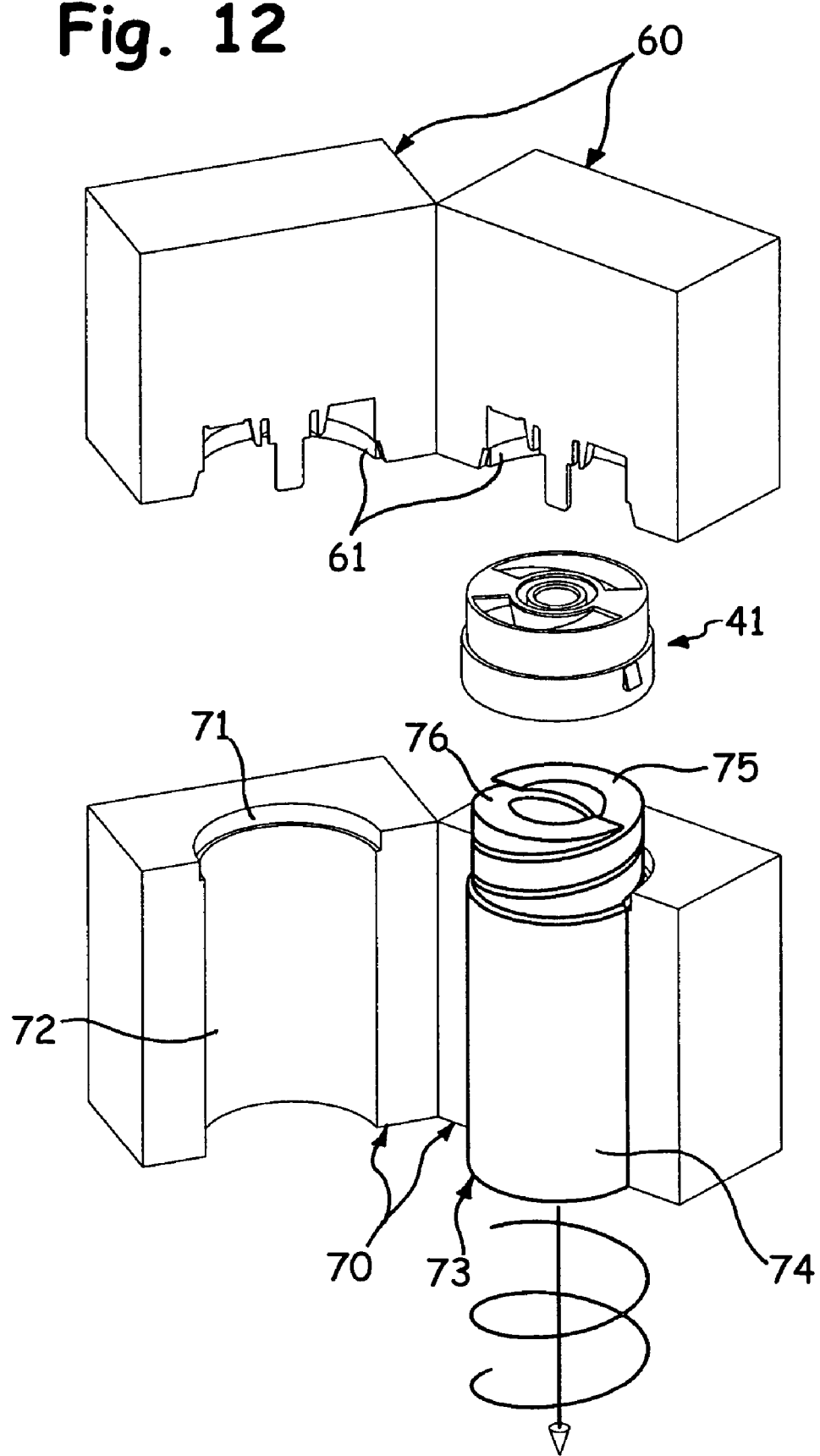

METHOD FOR MANUFACTURING A CONVEYING ELEMENT OF AN AXIAL TYPE FLOW METER USED FOR DRINK VENDORS

The present application is a Continuation of International Application PCT/IB03/02681, with an international filing date of Jun. 13, 2003, the disclosure of which is incorporated into this application by reference; the present application is further based on Italian Patent Application No. TO2002-A000518 filed on Jun. 17, 2002, the disclosure of which is also incorporated into this application by reference.

BACKGROUND OF THE INVENTION

1. Field of the Invention

The present invention refers to a device for measuring or controlling a fluid, in particular the flow rate or amount thereof, and to a method for manufacturing said device.

2. Description of the Related Art

Meters as those referred to are used in various fields, among which devices for metering and mixing liquid ingredients in drink vending machines, known in the field as "post-mix" dispensers; said dispensers typically operate by mixing a given amount of water with a given amount of syrup, so as to supply the desired drink to a user; to this purpose they comprise at least two electric valves, for water and syrup respectively, installed so as to operate together. Said electric valves are generally integrated into one module shaped as one multi-way valve or mixing valve, which can also be removed from the dispenser to maintenance, cleaning, etc. purposes.

In most cases the metering of the two ingredients is carried out by opening for a given time the ducts for water and syrup, which are supposed to be at a constant flow rate, by acting upon a corresponding valve.

In other known solutions (see for instance EP-A-0 607 376), water metering is carried out by calculating its actual amount by means of a flow meter.

At the state of the art "post-mix" dispensers use for metering the amount of water a tangential flow meter, i.e. in which the flow of water is oriented tangentially on the radial blades of the impeller of the meter, i.e. in which the fluid flow is perpendicular to the rotation axis of the impeller. Said meters, commonly fitted into the mixing valve, are bulky and increase the overall size of the valve body; furthermore, they are shaped as a separate part of said valve body, which involves specific sealing fastening operations, for instance by means of a cap placed on said body, also with the risk of deterioration of the washers and subsequent leaks. Furthermore, the maintenance operations on the meter are quite complicated, since the latter is located within the dispenser in such a position that a large part of the mixing valve has to be disassembled to this purpose.

Axial flow meters are also known, i.e. in which the flow of the fluid to be measured is let in with a substantially axial direction with respect to the impeller and/or to the duct into which the latter is fitted, which are generally smaller than the aforesaid tangential meters. Such a device, i.e. an axial device, designed to be used in household washing machines and in water supply systems, is known for instance from EP-A-0 599 341.

The use of axial flow meters, however, is usually not recommended in case of very low liquid flow rates, which means that today they are not used in electric valves operating in such conditions, and in particular in valves for post-mix dispensers as previously referred to, which are characterized by low flow rates.

SUMMARY OF THE INVENTION

A general aim of the present invention is to carry out a flow meter, in particular designed to be fitted into the body of an electric valve, which can be advantageously used in various fields, among which the one of post-mix vendors, simple to be carried out, reliable and cheap, both from a manufacturing and from an assembling point of view.

Another aim of the invention is to envisage an advantageous method for carrying out said meter.

An additional aim of the invention is then to envisage an improved valve or mixing device, in particular for a post-mix vendor.

These and other aims are achieved according to the present invention by a device for measuring or controlling a fluid, by a method for manufacturing a flow meter and by a mixing device having the characteristics of the appended claims, which are regarded as an integral part of the present description.

BRIEF DESCRIPTION OF THE DRAWINGS

Further aims, characteristics and advantages of the present invention shall be evident from the following detailed description and from the accompanying drawings, provided as a mere explaining non-limiting example, in which:

FIG. 3 is a partial section of the valve of FIG. 1;

FIG. 4 is an exploded view of an insert being part of the valve according to the invention;

FIG. 12 is a perspective view in vertical section of a mold used for manufacturing at least one of the components of the device according to the invention.

DESCRIPTION OF PREFERRED EMBODIMENTS OF THE INVENTION

Figure 1:
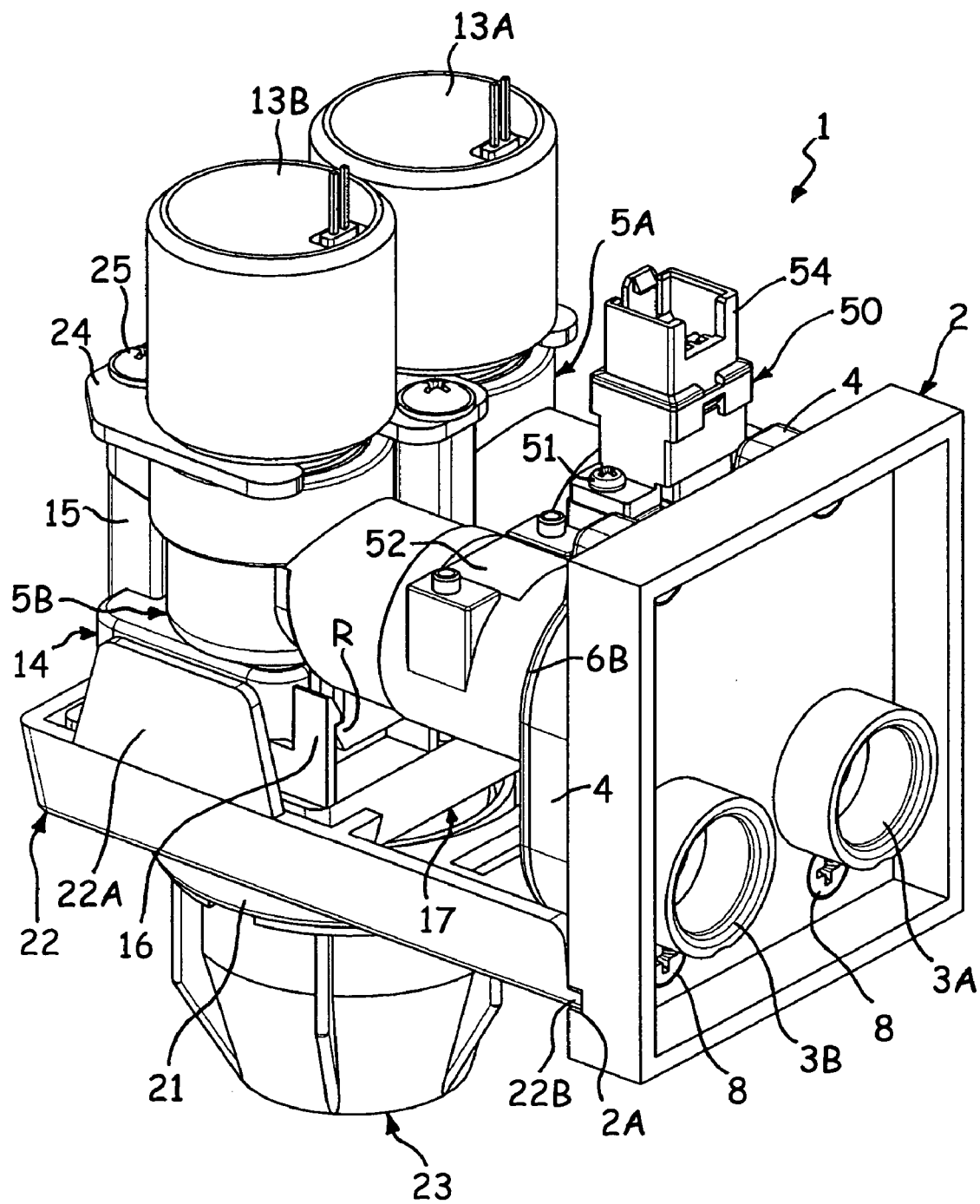
FIG. 1 is a perspective view of a mixing valve for a post-mix vending system, comprising a device according to the invention.

In FIG. 1, the numeral 1 globally refers to an electric valve which, in the case disclosed as example, is a mixing valve for a post-mix drink vendor.

Figure 2:
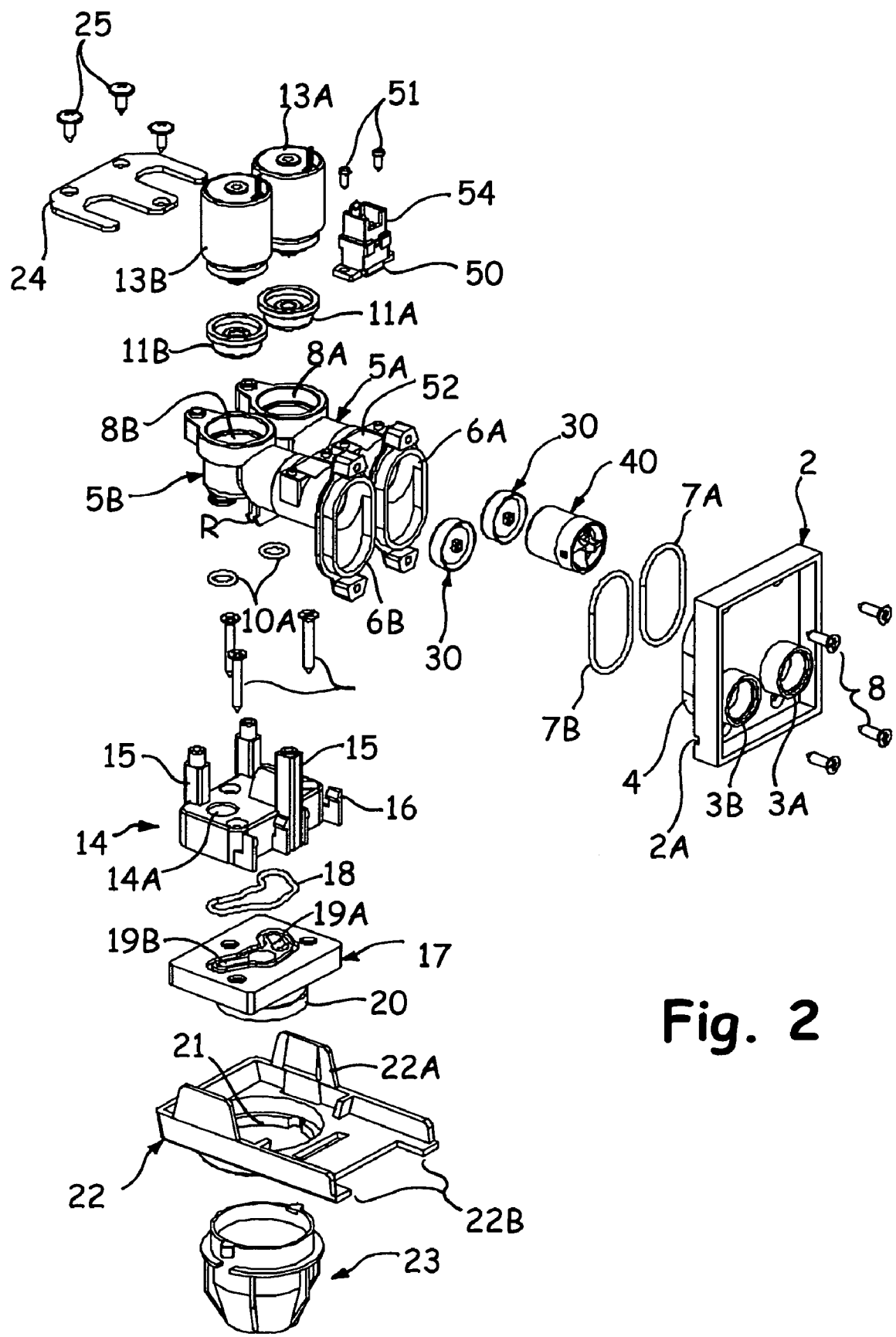
FIG. 2 is an exploded view of the valve of FIG. 1.
Figure 5:
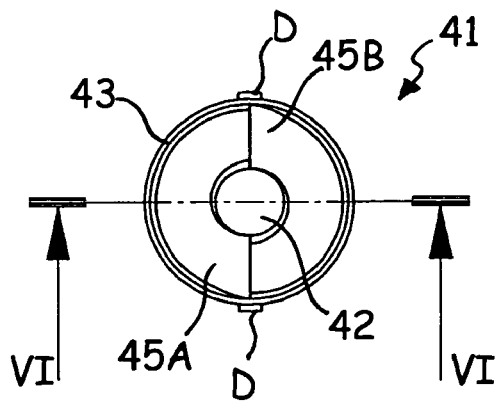
FIG. 5 is a plan view of a component of the insert of FIG. 4.

FIG. 2 shows the exploded view of the non-limiting example referring to the manufacturing of the electric valve 1, which comprises an interconnection element 2, shaped like a plate, designed for a rapid coupling with a drink vending machine, not shown; the interconnection element 2 can be carried out with known techniques, so as to enable a fast mechanical and/or hydraulic and/or electric connection of the device 1 to its corresponding vendor.

The interconnection element 2 defines two passages, each designed to be connected to a source of a corresponding liquid ingredient, which are supposed to be here water and syrup; said passages end up in the inner part of the interconnection element 2 into two connection fittings, referred to with 3A and 3B respectively. The opposite part of the interconnection element 2 defines two connecting portions, one of which is referred to with 4 in FIG. 2, for corresponding coupling portions 6A, 6B of two valve bodies, referred to with 5A and 5B, basically parallel to one another and defining a corresponding inner duct through which the liquid passes. The coupling portions 6A, 6B are designed to be fitted onto the corresponding portions 4 of the interconnection element 2, with the interposition of a sealing washer 7A, 7B; the fastening between the parts is carried out by means of screws, referred to with 8.

Each valve body 5A, 5B defines a chamber 8A, 8B housing a corresponding actuating group. Each chamber 8A, 8B, which in the example shown in FIG. 2 is open upwards, has an inlet and an outlet, referred to with 9 and 10 in FIG. 3, which are part of the aforesaid passage duct; a sealing ring 10A is provided on the end portion of each outlet 10.

Each chamber 8A, 8B is designed to house a membrane or sealing washer, referred to with 11A, 11B in FIG. 3, and a corresponding shutter, schematically referred to with 12 in FIG. 3; as can be seen in said figure, the shutter 12 acts on the inlet 9 of the corresponding chamber 8A, 8B; the shutter 12 is actuated by means of a corresponding position-controllable actuator 13A, 13B, in particular a proportional electromagnet, arranged above the corresponding chamber 8A, 8B.

The outlet 10 of each valve body 5A, 5B is fitted sealingly by means of the ring 10A into a corresponding passage 14A defined in a hooking element 14, basically cap-shaped, from which uprights 15 and hooking teeth 16 rise, the latter being designed to couple elastically with projections R defined in the two valve bodies 5A, 5B.

The hooking element 14 is fitted onto an underlying manifold 17 and fastened to the latter by means of screws 14B, with the interposition of a suitable sealing washer 18; the manifold 17 contains two chambers 19A, 19B, which—referring to the accompanying drawings—are open upwards, in the area where the outlets 10 of the two valve bodies 5A, 5B end up; said chambers 19A, 19B basically convey both water coming from the outlet 10 of the body 5A and syrup coming from the outlet 10 of the body 5B into corresponding outlets, not visible in the figures, which get in their turn, though being two separate ducts, into a common outlet element referred to with 20 in FIG. 2.

The outlet element 20 is fitted into a passage 21 getting through a lower plate 22, hooked to the element 14 by means of teethed fins 22A; the lower plate 22 is arranged basically perpendicularly with respect to the interconnection element 2, and so that its two ends 22B are partially fitted into corresponding positioning seatings 2A present in said element 2. The passage 21 is hooked to a supply nozzle, globally referred to with 23, for instance by means of a bayonet coupling or by screwing; the nozzle 23 contains inside a static mixer, carried out in according to the state of the art.

The numeral 24 refers to a bracket, secured by means of screws 25 onto the upper ends of the uprights 15 of the hooking element 14, so as to keep the electromagnets 13A, 13B in position.

According to an important feature of the present invention, an insert comprising at least an impeller is fitted into at least one of the valve bodies 5A, 5B, or better into at least one of the corresponding ducts, whereas a unit detecting the turns of the impeller is secured outside said valve body.

According to another feature of the invention, a flow regulator, in particular a membrane regulator, is fitted into at least one of the valve bodies, or better into at least one of the corresponding ducts.

In the exemplified case, said flow regulator, insert with impeller and detecting unit, referred to with 30, 40 and 50 respectively, are associated in the inner duct within the valve body 5A, whereas only a flow regulator 30 is fitted into the inner duct within the valve body 5B.

As can be inferred from FIG. 1, the detecting unit 50 is secured by means of screws 51 onto a seating 52 defined on the surface of the valve body 5A, in the area in which the impeller of the corresponding insert 40 is operatively located. The regulator 30 is fitted into the corresponding valve body 5A, until it abuts against a narrowing of the inner duct of said body; the regulator 30 can be kept in the position it has reached by means of a snap coupling or by mechanical interference with the surface of the inner duct within the corresponding valve body, as can be seen for instance in FIG. 3.

Always from FIG. 3 it can be inferred how also the insert 40 is fitted into the corresponding valve body 5A, until a projecting peripheral portion abuts against a corresponding narrowing of the inner duct within said valve body; the insert 40 is kept in position through suitable means, for instance by fastening the body 5A onto the plate 2.

The insert 40 and some of its components are shown in different views in FIG. 4 to 9.

In said figures the numeral 41 refers to a conveying element or diffuser, comprising in particular a central core 42 and an outer ring 43; according to an example of the present invention, the space between the core 42 and the ring 43 defines at least two helical channels for the flow of liquid to be measured, referred to with 44A and 44B. Said helical passages 44A, 44B are formed thanks to the presence of two walls or deflectors or spiral separators 45A, 45B extending in width direction between the core 42 and the ring 43, and developing on the height of said core. The shape and development of said separators 45A, 45B with helical surface, extending radially and symmetrically around the core 42, can be seen well in FIGS. 8 and 9, in which the outer ring 43 of the diffuser 41 has not been shown for reasons of clarity.

The double helix formed by the separators 45A, 45B preferably has a pitch of about 8 mm with a height of the core 42 of about 9 mm, and anyhow is carried out so that there is a substantial overlapping of the two separators, and in particular with an angle greater than 180°; in the case shown by way of example the overlapping angle between the separators is of about 180°+45°. Said structure is particularly advantageous so that the flow of water getting through the diffuser 41 is constrained within the channels 44A and 44B.

Figure 6:
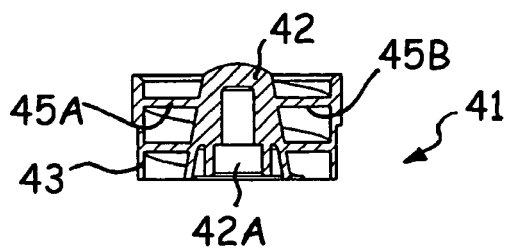
FIG. 6 is a sectioned view according to line VI—VI of FIG. 5.
Figure 7:
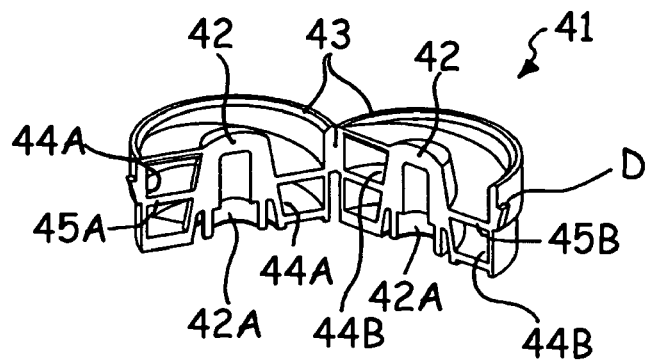
FIG. 7 is a vertically sectioned view of the component of FIG. 5.

The central core 42 preferably has the shape of a frustum of cone, or anyhow such as shape as to result in a narrowing of the section through which water passes in the end portion of the diffuser 41; from FIGS. 6 and 7 it can be inferred how, given the shape of the core 42, the inlet section of the channels 44A and 44B is greater that the corresponding outlet section; said contrivance enables to increase the flow speed. In the preferred embodiment of the invention said variation of the passage section is basically uniform on the whole height of the diffuser 41, so as to create a gradual rise in flow speed; in the case shown by way of example in the figures the inlet section of the channels 44A and 44B is of about mm 5.7×3.2=18.24 mm², whereas the outlet section of said channels is of about mm 3.5×3.2=11.2 mm², i.e. with a narrowing of the passage of about 40%, with a subsequent rise in the speed of the passing flow.

Figure 8:
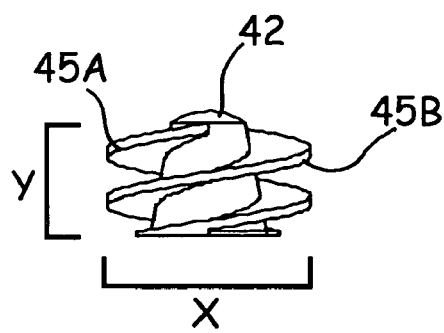
FIGS. 8 and 9 are two perspective views, from different angles, of a portion of the component of FIG. 5.
Figure 9:
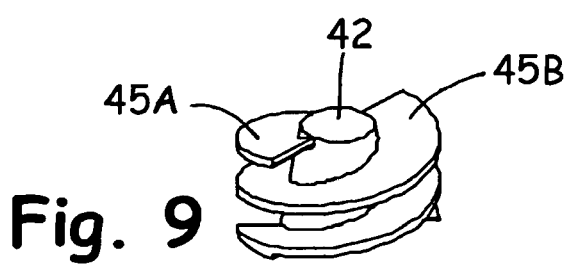

The rise in liquid speed is further increased by the fact that the height development of the double helix, i.e. the dimension referred to with Y in FIG. 8, is smaller than its maximum lateral size or outer diameter, i.e. the dimension referred to with X in said figure.

Going back to FIGS. 3 and 4, the diffuser 41 acts by conveying the water flow onto an underlying impeller, referred to with 46.

Figure 10:
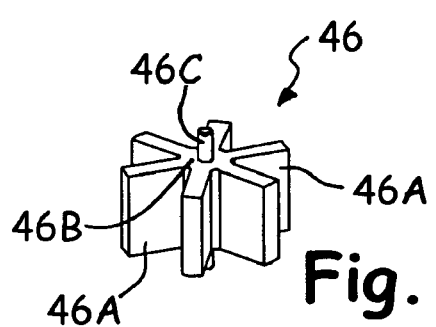
FIGS. 10 and 11 are two perspective views showing possible execution variants of an impeller being part of the insert of FIG. 4.
Figure 11:
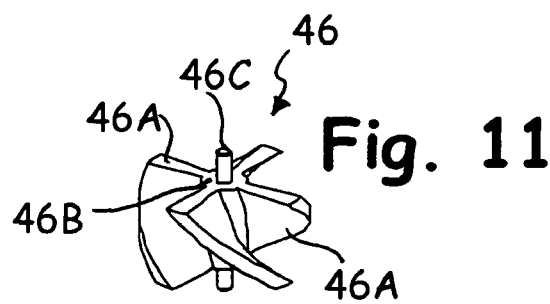

In the exemplified case the impeller 46 has a body having a substantially cross-shaped section, and therefore defining a series of blades 46A starting from a core 46B, with which an axial pin 46C is integral; in the embodiment shown in FIG. 4, there are four blades 46A, but their number can be raised in order to increase the capacity of the impeller to catch liquid; in said light, in a preferred embodiment of the invention the impeller 46 can have six blades, as shown in FIG. 10. As an alternative to a rectilinear development of the blades 46A, i.e. basically parallel to the pin 46C, said blades could advantageously be inclined or have a helical shape, as shown in FIG. 11, where the inclination is in the opposite direction with respect to the separators of the diffuser 41.

The impeller 46 is preferably carried out with a compound of barium or strontium ferrite alloyed with a thermoplastic component; said material, also known as plastoferrite, is permanently magnetized and therefore preserves to an unlimited extent its magnetic properties if kept within a temperature range between −20 and +70° C.

The blades 46A of the impeller 46 are then associated to magnetic polarities, whose aim is to induce an electric signal in a convenient magnetic sensor (in the following referred to with 53) located outside the duct of the valve body 5A.

The numeral 47 refers to a cylindrical envelope, open on its upper end and having on its lower end a series of support elements or spokes 47A, which extends radially from a central core 47B on the cylindrical wall 47C of said envelope, as can be seen for instance in FIG. 3.

The element 41 and the envelope 47 are shaped so as to fit one into the other by means of reciprocal hooking means, so as to form the insert 40 comprising the impeller 46 and the diffuser 41; the aforesaid hooking means consist, in the case shown by way of example in the figure, of teeth D defined on the outer surface of the ring 43 of the element 41, which can elastically engage into corresponding seatings S defined in the upper portion of the envelope 47.

The core 42 of the diffuser 41 defines a seating, referred to with 42A in FIG. 6, housing a bushing 48A supporting the pin 46C of the impeller 46 (as can be seen in FIG. 3); a similar bushing, referred to with 48B, is placed on a seating defined within the core 47B of the body 41 (see FIG. 3); in said seating, below the bushing 48B, a collar disk 48C for the pin 46C of the impeller 46 is arranged.

The bushings 42A, 48B and the disk 48C are preferably carried out in a material having a low friction coefficient and a high resistance to wear and tear (chosen for instance among bronze, graphite, hard stones and/or materials having similar features suitable to this purpose), so as to improve the performances of the electric valve 1, in particular as far as its accuracy and life are concerned.

The flow regulator 30 has a variable section and exploits the elastic deformation of a membrane, referred to with 31 in FIG. 3, subject to the action of the flow for the self-adjustment of the liquid passage; always in FIG. 3, the numeral 32 refers to spacers having a gauged height and distribution, arranged under the membrane 31, which allow to limit the closing of an axial passage and therefore define a maximum liquid flow rate.

It should be noted that the flow regulator 30 could be an integral part of the insert 40 and replace in particular its lower portion, i.e. the portion carrying the aforesaid support elements 47A; in said execution variant, the central part of the flow or flow rate regulator 30 could house the bushing 48B and/or the disk 48C.

As was said and as can be inferred from FIG. 3, the components 30 and 40 are housed in said sequence in the inner duct within the valve body 5A. Outside said duct, on the body 5A is secured the detecting unit 50, which comprises a magnetic detector 53, lying on the same axis or aligned with the blades 46A of the impeller 46. The unit 50 integrates a connector, in particular a male connector, which can be coupled in a removable way with a corresponding connector, in particular a female connector, referred to with 54, which is connected to electric wires for the rapid wiring of the unit 50 with a control and/or processing device, not shown in the figures, for instance being part of the control system of the drink vendor.

The electric mixing valve 1 works as follows.

When a drink has to be prepared, the appliance integrating the electric valve 1 acts by mixing a given amount of water and a given amount of syrup; to this purpose, the connections 3A and 3B are connected to the corresponding sources of water and syrup. In the case shown by way of example the electric mixing valve 1 is designed to measure directly the necessary amount of water, let in through the valve body 5A; conversely, syrup is metered by proportionally adjusting and/or by opening for a given time the intake duct within the valve body 5B.

After a drink request, carried out for instance by manually acting upon an electric switch, the control system of the vending machine on one hand suitably excites the electromagnet 13B; this results in that the shutter 12 protruding into the duct within the valve body 5B is lifted, so as to open oppositely (for instance proportionally) the corresponding inlet 9 leading to the chamber 8B; syrup then gets into the chamber 8B and flows through the outlet 10 into the corresponding chamber 19B of the manifold 17. The electromagnet 13B is excited in the way and as long as it is deemed as necessary in order to obtain the desired amount of syrup.

On the other hand, the control system of the drink vending machine excites basically in the same way also the electromagnet 13A, thus putting into motion the corresponding shutter 12. Thus, water getting in from the connection 3A gets into the helical cannels 44A and 44B of the diffuser 41 and is then conveyed to the blades 46A of the impeller 46. The impeller 46 is then put into angular motion by the flow of liquid flowing out; the flow getting out of the envelope 47 is then stabilized by the flow regulator 30.

Water then reaches the chamber 8A of the valve body 5A through the corresponding inlet 9 not closed by the shutter 12, and then gets out of it from the outlet 10 and gets into the chamber 19A of the manifold 17. Syrup and water can then reach from the chamber 19A the nozzle 23, where they are conveniently mixed and then sent towards an underlying drink vessel.

The rotation of the impeller 46 is detected by the magnetic sensor or detector 53 of the unit 50, thanks to the fact that the impeller is made of magnetic material; the detections received by the detector 53 are transmitted to an electronic unit being part of the control system of the drink vendor, which defines on the basis of the ratio turns/volume the amount of water that has passed, and turns it into an electric control signal of the electromagnet 13A, which can conveniently vary the position of the corresponding shutter 12; for instance, when the amount of water that has gone through the valve body 5A corresponds to the pre-established one, the electromagnet 13A is unexcited, so that the shutter 12 goes back to its original position and shuts the inlet 9.

The shape of the diffuser 41, characterized by the presence of the helical channels 44A, 44B, results in that—also in case of low water flow rates—the flow certainly strikes the blades 46A of the impeller 46, with an increased moment of impact of the liquid onto the impeller and a consequently high rotation speed of the latter, thus enabling a high measuring resolution; this is favored also by the fact that the flow getting out of the channels 44A, 44B has a high angle of incidence onto the blades of the impeller (substantially, in the case shown by way of example, the angle between the direction of the flow and the surface of the impeller blade tends to be almost perpendicular).

Said feature allows, if necessary, to use a flow meter comprising the insert 40 and the unit 50 also for a volumetric metering of the syrup; in such a case, therefore, an insert 40 will be fitted into the inner duct within the valve body 5B, and a unit 50, suitably interfaced with the control system of the drink vendor, will be secured to the outer surface of said body. The operating group consisting of the insert 40 and of the unit 50 for metering the syrup will work in the same way as previously described.

The flow meter described above can be particularly advantageous in post-mix vendors thanks to its small size and to the fact that the insert 40 can be fitted directly into the addition duct for the liquid to be measured. Said features, beyond involving the reduction of the overall dimensions of the electric valve 1, prevent the need for specific fastening and sealing means, which are typical of tangential flow meters used until today to this purpose in post-mix vendors. Also the assembling operations for the electric valve 1 are simpler and faster; the same applies for the maintenance of the device, which requires only the separation of the valve bodies 5A, 5B from the fastening plate 2, so as to reach the insert 40 (note that the prior art requires an almost complete disassembly of the device, since the intervention on the tangential flow meter presupposes for instance the removal of the lower plate from the device, which plate supports the dispenser and is secured to the front hooking plate—see for instance EP-A-0 607 376).

The envelope 47 of the insert 40 can be carried out in a thermoplastic material by a simple molding operation; the same applies to the magnetically active portion of the impeller 46, which is associated to the axial pin 46C; the bushing 48A, 48B and the collar 48C are commercial components.

According to a further important feature of the invention, also the diffuser 41 can be carried out as one piece made of thermoplastic material by means of a molding operation, although its shape implies the presence of undercuts.

FIG. 12 schematically show the means, which according to said feature of the invention, are used for molding the diffuser 41.

In said figure the numerals 60 and 70 refer to, respectively, to an upper half-mold and a lower half-mold (or, in further detail, a half-mold 60 on the injection side and a half-mold 70 on the ejection side), each half-mold defining a corresponding impression 61, 71.

The impression 61 corresponds to a part of the outer shape and to a part of the inner shape of the diffuser 41, which in FIG. 12 is shown as turned upside down with respect to FIG. 4; the impression 71, conversely, corresponds to the remaining part of the outer shape of the diffuser 41.

The half-mold 70 has a corresponding seating 72 for a sliding and turning tool, i.e. moving in linear and angular direction, globally referred to with 73; said tool 73 comprises a full support portion 74, on whose upper ends a male is defined, i.e. the impression of at least a part of the inside of the diffuser 41; in particular, said male consists of two spiral plates 75 and 76, wound up one into the other without touching; the outer diameter of the coils formed by the plates 75 and 76 is preferably constant and slightly smaller than the portion 74 and/or smaller than the diameter of the outer impression 61, 71 carried out on the half-molds 60 and 70.

The inner diameter of the aforesaid coils, conversely, preferably decreases starting from the area of connection to the support portion 74 (i.e. it decreases from bottom to top, with reference to FIG. 12).

In order to carry out the element 41 the half-molds 60 and 70 are joined and the tool 73 is placed within the cavity formed by the impressions 61 and 71 and moved up to its operating position.

The thermoplastic material is then injected, hot and fluid, into said cavity through a convenient passage, not shown in FIG. 12, so that said material fills up all free gaps; thus, the impressions 61 and 71 enable to define the outer surface or profile and a part of the inner profile of the element 41, whereas the male 7–6 enables to define a large part of the inner surface or profile of the element 41, characterized in particular by the presence of the core 42 and of the separators 45A, 45B.

The fact that the inner diameter of the coils formed by the plates 75 and 76 decreases allows to give the core 42 the shape of a frustum of cone, whereas the fact that the coils of the plates extend "parallel" to one another without touching results in the presence of gaps for the thermoplastic material, for the formation of the separators or inclined planes 45A, 45B; in said light the distance in height between the two plates will correspond to the thickness of said separators 45A, 45B.

Once the time required for the thermoplastic to set has passed, the tool 73 is "unscrewed", i.e. moved in linear and angular direction, so as to take the male 7–6 out of the cavity formed by the impressions 61 and 71, by turning it in the suitable direction. The half-molds 60 and 70 are then separated for taking out the piece, now completely formed, i.e. the diffuser 41.

As can be inferred, the process described above enables to carry out the diffuser 41 in a simple, fast and cheap way, with clear advantages from a manufacturing point of view, despite the particular shape of said diffuser, characterized by the presence of undercuts, i.e. areas of the piece that would prevent the ejection from the mold with simple movements, such as a linear translation of two half-molds with complementary impressions.

Said process thus allows to carry out a piece giving the device according to the invention new performances, enabling for instance to improve measuring yields and resolution with low flow rates of the fluid to be checked.

The description made above, as well as the appended claims that are an integral part of it, points out the characteristics of the present invention as well as its advantages. Among the latter let us remind the modularity of the insert 40 and/or of the detecting unit 50 and/or of the flow or flow rate regulator 30, if present, which results in an easy assembly and in a smaller number of said elements during the manufacturing cycle, according to the various needs; said characteristic further simplifies the maintenance of the device equipped with said components, for instance in case of periodic cleaning or replacement due to anomalies on the spot.

Obviously, technicians skilled in the art can make several variants to the device described by way of example, without leaving the framework of the invention.

In the application previously shown by way of example the valve bodies 5A and 5B are shaped as separate but identical pieces; furthermore, in a possible variant said bodies could be carried out as one body, with further advantages from the point of view of manufacturing and assembling convenience for the device 1; also the hooking element 14 of the electric valve 1 could be carried out as one body with the valve bodies 5A, 5B.

According to a further possible execution variant, also the impeller of the insert 40 could be equipped with an outer ring, and be carried out with a process similar to the one described above with reference to FIG. 12; the blades of such an impeller could be inclined in the opposite direction with respect to the separators 45A, 45B of the diffuser 41.

The progressive narrowing of the section where fluid passes through the diffuser 41, i.e. the progressive narrowing of the channels 44A and 44B could be obtained differently from what has been shown above by way of example, based on the shape substantially as a frustum of cone of the central core 42. To this purpose, for instance, the section or thickness of the outer ring 43 could be changed, though keeping a substantially cylindrical shape for the core 42, or changing the thickness of the separators 45A, 45B and so on.

The mold used for manufacturing the diffuser 41 could possibly be carried out as one body, having a corresponding inner impression, defining the cavity housing the male 7–6, as previously shown.

The invention has been described with reference to an electric valve of a drink dispenser, but it will be apparent that the same can be used in connection with electric valve of other type and/or use, namely electric valve used in water distribution systems and in household appliances, such as laundry washer and dishwasher, water heaters, water softener, etcetera.

What is claimed is:

1. A method for manufacturing a conveying element for an axial type flow meter comprising an impeller (46) having at least a blade (46A) extending from a hub (46B) to which a rotation pin (46C) is associated, and a conveying element (41) having a central core (42), a peripheral part (43) and one or more blades (45A, 45B) with a helical surface developing with at least a complete coil around said core (42), where the conveying element (41) has a profile and is made as one piece by molding a thermoplastic material, comprising the following steps: providing a molding element (60, 70) defining an impression (61, 71) for the formation of at least a part of the profile of the conveying element (41), said impression (61, 71) forming a cavity;

providing a male (75–76) comprising one or more spiral plates (75, 76); positioning of said male (75–76) in said cavity through a corresponding injection opening (72);

injection of a fluid thermoplastic material into said cavity through said corresponding injection opening to form the conveying element therein; removal, after setting of the thermoplastic material, of the male (75–76) from said cavity, by substantially unscrewing the male from the conveying element thus formed and moving the male backwards away from said cavity; extraction of the conveying element (41) thus formed from the molding element (60, 70).

2. The method according to claim 1, in which the molding element comprises at least two molding units (60, 70) each defining a half-impression (61, 71) for the formation of a corresponding part of the profile of the conveying element (41);

the two molding units (60, 70) are joined one to the other so that the corresponding half-impressions (61, 71) form said cavity;

after the setting of the thermoplastic material and the removal of the male (75–76) from said cavity, the two molding units (60, 70) are separated in order to take out the conveying element (41) thus formed.

3. The method according to claim 1, in which the male (75–76) comprises at least two spiral plates (75, 76) wound up one into the other without touching.

4. The method according to claim 1, in which an outer diameter of a coil or coils formed by said plate or plates (75, 76) is substantially identical.

5. The method according to claim 1, in which a diameter of a coil or coils formed by said plate or plates (75, 76) is decreasing.

6. The method according to claim 1, in which an outer diameter of a coil or coils formed by said plate or plates (75, 76) is increasing.

7. The method according to claim 1, in which an inner thickness of a coil or coils formed by said plate or plates (75, 76) is increasing.

* * * * *